United States Patent [19]

Lumetta

[11] Patent Number: 5,050,433
[45] Date of Patent: Sep. 24, 1991

[54] ELECTRONIC CIRCUIT FOR FUEL LEVEL SENSOR

[75] Inventor: Jeffrey J. Lumetta, Union Lake, Mich.

[73] Assignee: Jabil Circuit Company, Madison Heights, Mich.

[21] Appl. No.: 582,753

[22] Filed: Sep. 14, 1990

[51] Int. Cl.⁵ ............................................ G01F 23/36
[52] U.S. Cl. ...................................... 73/313; 73/308; 340/20
[58] Field of Search ...................... 73/304 R, 308, 313, 73/304 C; 340/509, 620; 324/693, 697, 699, 705, 706; 364/509, 550, 560

[56] References Cited

U.S. PATENT DOCUMENTS

| | | | |
|---|---|---|---|
| 4,102,191 | 7/1978 | Harris | 73/308 X |
| 4,250,750 | 2/1981 | Martinec et al. | 73/308 |
| 4,627,283 | 12/1986 | Nishida et al. | 73/308 X |
| 4,731,730 | 3/1988 | Hedrick et al. | 73/304 X |
| 4,745,803 | 5/1988 | Haavasoja | 324/699 X |
| 4,782,698 | 11/1988 | Wilson | 73/304 C |
| 4,782,699 | 11/1988 | Gonze | 73/308 |
| 4,890,491 | 1/1990 | Vetter et al. | 73/313 X |
| 4,908,783 | 3/1990 | Maier | 73/304 R X |

Primary Examiner—William A. Cuchlinski, Jr.
Assistant Examiner—G. Bradley Bennett
Attorney, Agent, or Firm—Harness, Dickey & Pierce

[57] ABSTRACT

Corrosion of the fuel tank float device by electrolysis is minimized by driving the fuel level sender with short duty cycle pulses instead of a continuous current. While the fuel level sender is energized by a pulse, the analog sample and hold circuit obtains a reading from which fuel level can be determined. A synchronizing circuit controls the sequence in which the fuel level sender is energized and the reading taken, to insure that readings are taken during steady state conditions. An impedance matching circuit compensates for nonlinearities of the fuel level gauge. The impedance matching circuit includes a pair of precision resistors and a voltage multiplier circuit. The impedance matching circuit allows the moving coil fuel level gauge to be energized in a fashion which simulates a continuous current flowing between fuel level sender and gauge. The circuit can be interposed between conventional fuel level sender and conventional moving coil gauge, requiring little or no modification of those components but greatly reducing corrosion due to electrolysis.

10 Claims, 2 Drawing Sheets

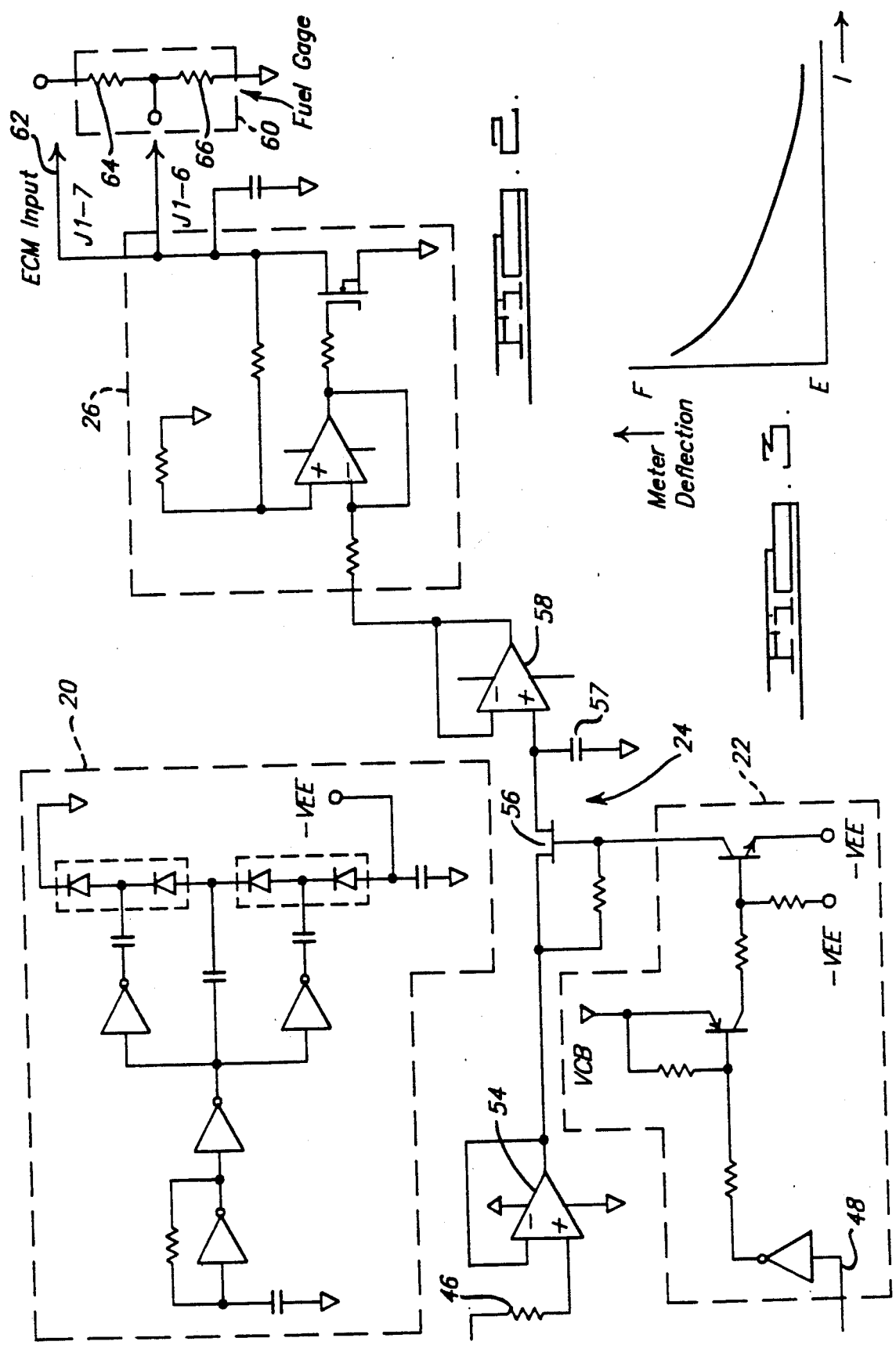

ELECTRONIC CIRCUIT FOR FUEL LEVEL SENSOR

FIELD OF INVENTION

This invention relates to devices for measuring the fuel level in automotive vehicle fuel storage tanks. More specifically, it relates to electrically operated fuel level sensors employing a float device in the fuel tank and a gage or ECM display for viewing by the vehicle operator.

BACKGROUND AND SUMMARY OF THE INVENTION

Devices for measuring the fuel level in motor vehicles typically consist of a float device in the fuel tank which includes a variable impedance element whose impedance varies in proportion to the fuel level in the tank. Typically, this impedance is read by a coil-type fuel gage mounted in the dashboard. Conventional fuel level measuring devices produce a continuous current flow through the variable impedance element of the float device in order to maintain a steady fuel reading by the gage. Conventional coil-type fuel gages in use today are nonlinear devices. That is, a nonlinear change in gage current must be supplied to produce a linear change in gage needle deflection.

The increased use of alcohol based fuel has created difficulties in using traditional means for measuring fuel levels. The continuous current flowing through the float device element causes electrolysis due to the alcohol in these fuels, resulting in the eventual corrosion of the float device. It has been proposed to send current through the float device at periodic intervals to reduce the corrosion caused by electrolysis. In this regard, some have experimented with using digital microprocessor devices to read the float data through an analog-to-digital converter. However, this purely digital approach requires complex data conversion routines to compensate for the nonlinearity of the coil gage mechanism. Since these complex data conversion routines require expensive analog-to-digital converters and expensive microprocessors, this approach is too expensive and not practical for most mass produced automotive vehicles.

Thus it is an object of the present invention to provide an inexpensive, practical and yet accurate apparatus for measuring fuel level using a pulsed energy source to retard electrolysis in the float device. It is a further object to provide an inexpensive analog apparatus which matches the nonlinear needle deflection versus current characteristics of the coil gage over the entire operating range, thereby eliminating the need for expensive analog-to-digital converters and complex data conversion routines.

To realize the above objects, there is provided, in accordance with one aspect of the present invention, a circuit for interconnecting a variable impedance fuel level sender of a fuel tank with a fuel gage of the type having nonlinear characteristics. This circuit comprises: a synchronizing circuit; a pulsed energy source controlled by the synchronizing circuit and coupled to the sender for periodically energizing the sender; an impedance matching circuit having a Thevenin impedance substantially equal to the Thevenin impedance of the gage and coupled to the sender for sensing a condition indicative of the level of fuel in the tank; a sample and hold circuit coupled to the impedance matching circuit and to the gage, controlled by the synchronizing circuit for sampling the condition sensed by the impedance matching circuit and supplying a signal for causing the gage to display the level of fuel.

The synchronizing circuit is a low cost microprocessor or microcontroller capable of sending a sequence of signals. The pulsed energy source is capable of supplying a voltage level in proportion to the input ignition voltage. In the presently preferred embodiment the impedance matching circuit is composed of two resistors which are coupled to have an impedance substantially equal to that of the gage. One of the resistors is further connected in parallel with the sender and in series with the second resistor. The sample and hold circuit is activated by the synchronizing circuit after the pulsed energy source has activated the sender.

These and other objects, advantages and aspects of the present invention may be further understood by referring to the detailed description, accompanying figures and appended claims.

BRIEF DESCRIPTION OF THE DRAWINGS

Identical reference numerals designate like features in the different figures where:

FIGS. 1 and 2 are a schematic diagram of the circuit of the invention. More specifically:

FIG. 1 is a circuit diagram of the synchronizing circuit, one of the power sources that makes up the energized power source, and the impedance matching circuit;

FIG. 2 is a circuit diagram of another power source making up the energized power source, the sample and hold circuit, a voltage multiplier and the output to the fuel gage and other devices;

FIG. 3 is a graph illustrating the nonlinearity of the fuel gage; and

DETAILED DESCRIPTION OF THE PREFERRED EMBODIMENTS

Figure 1:
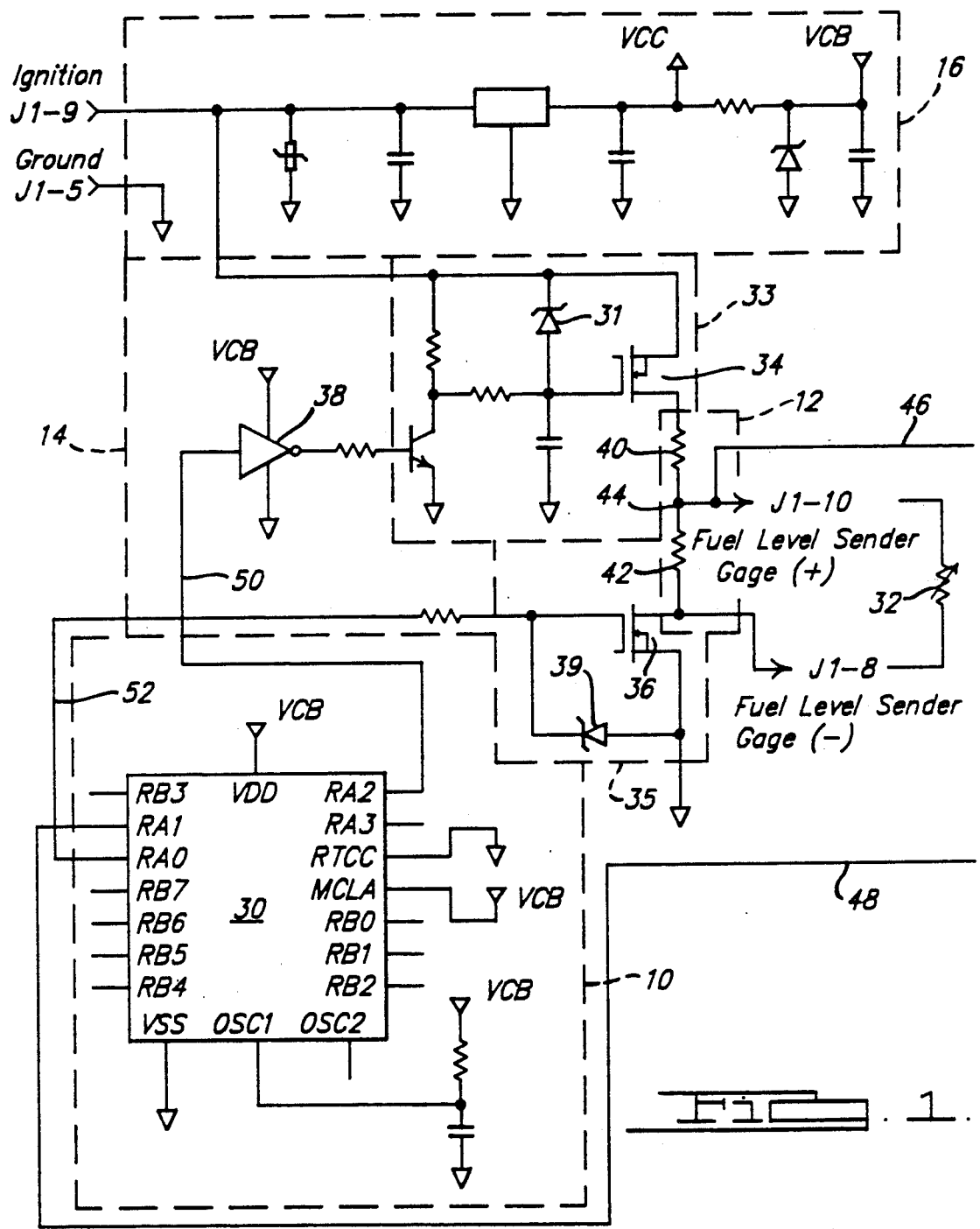

Turning now to FIG. 1, there is shown a synchronizing circuit 10, an impedance matching circuit 12, a pulsed energy source circuit 14 and a positive voltage source 16. The synchronizing circuit 10 consists of a microcontroller 30 which is programmed to send at least three temporally discrete signals and to sustain these signals for predetermined periods of time. The synchronizing circuit controls current flow from various energy sources in the circuit as well as current through the fuel level sender 32. The pulsed energy source 14 consists of two control circuits. One control circuit 33 controls the connection of the input ignition voltage (J1-9) to the fuel level sender 32. The second control circuit 35 controls the connection of ground to fuel level sender 32. The primary switching devices for both control circuits 33 and 35 are transistors 34 and 36. The control circuits also employ zener diodes 31 and 39 which have a breakdown value of 15 volts to protect transistors 34 and 36 from excess voltage.

The impedance matching circuit 12 consists of two precision resistors 42 and 40 wired in series. The fuel level sender 32 is connected in parallel with precision resistor 42 and both of these resistors are in series with precision resistor 40. The Thevenin impedances of resistors 40 and 42 are substantially the same as the Thevenin impedances of the resistive components of fuel gage coils 64 and 66 (FIG. 2). The signal from the fuel level sender 32 is transmitted on line 46 to further processing circuitry of FIG. 2.

Turning now to FIG. 2, the circuit further comprises a charge pump negative voltage source 20, a second pulsed energy source 22, a sample and hold circuit 24, a voltage multiplier 26 and two output devices, fuel gage 60 and ECM display 62. Fuel gage 60 has a nonlinear meter deflection to applied current characteristic illustrated in FIG. 3. The sample and hold circuit 24, comprising JFET 56, capacitor 57 and amplifier 58, is activated by the pulsed energy source 22 which is controlled by the microcontroller 30 on line 48. Once turned on, the gate on JFET 56 must be driven at least 10 volts below the source in order to turn it off. The charge pump negative voltage source 20 supplies a negative 12 volts to turn off JFET 56. The fuel level sender signal on line 46 is buffered by operational amplifier 54 and then fed to the sample and hold circuit 24, where it is held and fed to a voltage multiplier 26. Voltage multiplier 26 in turn drives coil gage 60 and ECM input 62. The signal on line 46 is buffered by operational amplifier 54 so fuel level sender 32 is not loaded down.

The circuit functions as follows. The microcontroller 30 sends an initial signal along line 52 to activate transistor 36 which grounds the negative terminal of fuel level sender 32. While holding this signal on line 52 steady, the microcontroller 30 sends a second signal along line 50 to control circuitry 33 which connects voltage source 16 to impedance matching circuit 12. This completes the circuit between ground, input ignition voltage and the fuel level sender 32. The input ignition voltage is connected after control circuitry 35 connects the sender to ground. This minimizes electromagnetic interference and insures fuel level measurements are made under steady state conditions. While signals along lines 50 and 52 are held at a constant voltage, a third signal is sent along line 48 which activates the second pulsed energy source 22 thereby activating sample and hold circuit 24 and causing the output of fuel level sender 32 to be sampled. After the voltage on fuel level sender 32 is sampled, the microcontroller 30 turns off the signals in reverse order, deactivating energy source 22, control circuitry 33 and finally second control circuit 35.

Transistors 34 and 36 are FETs to avoid voltage drop on the completed circuit and to minimize sampling error. All processing circuitry employs CMOS components to minimize charge drain on capacitor 57, used to hold the fuel level signal.

Figure 4:
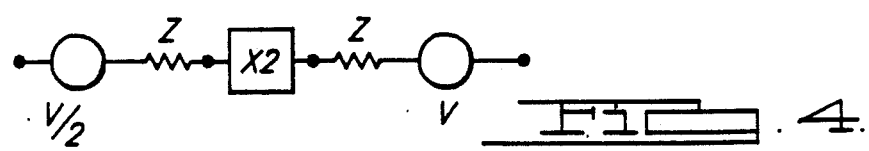
FIG. 4 is a simplified Thevenin equivalent circuit diagram useful in illustrating the invention.

The fuel level sender 32 is a variable resistor which varies from approximately 0 ohms when the fuel tank is empty to approximately 88 ohms when the fuel tank is full. In the preferred embodiment precision resistor 42 has a value of 49.9 ohms and precision resistor 40 has a value of 88.4 ohms. These values form a Thevenin impedance Z equal to the Thevenin impedance Z of coils 64 and of fuel gage 60. This is illustrated in FIG. 4.

Voltage doubler circuit 26 compensates for the Thevenin equivalent voltage V/2 of the matching circuit being half that of the Thevenin equivalent voltage V of the gage. This is also illustrated in FIG. 4, with the voltage multiplier designated X2.

The overall system may be pulsed on at relatively shorter intervals than it is pulsed off. The duty cycle in the preferred embodiment is less than 1%. The signal is sampled for 1 millisecond and held on capacitor 57 for 300 milliseconds. In this manner there is no current flowing through the fuel level sender during the off times of the circuit and electrolysis occurs at a much slower rate than when the fuel level sender is continuously energized.

By coupling fuel level sender 32 with this impedance matching arrangement the nonlinearity of the gage does not affect the accuracy of the fuel level reading. Although the gage is no longer directly wired to the fuel level sender, as is the conventional practice, the circuit simulates this effect so that conventional nonlinear gages may still be used.

It should be appreciated that the circuit of the foregoing embodiments are well suited to achieve the objects stated. It is recognized that those skilled in the art may make various modifications or additions to the preferred embodiment chosen to illustrate the invention without departing from the spirit and scope of the art. For example, the values of the precision resistors used in the impedance matching circuit may be varied according to the capacity of the various transistors used in the processing circuitry. In addition they may be altered to fit varying impedances of different models of fuel coil gages. Also, differing components may be used and substituted for the electronic components in the circuit. Finally, voltage levels may be altered to suit the particular application. Accordingly, it is understood that the present invention is not limited to the specific embodiment chosen to illustrate the invention, but should be deemed to extend to the subject matter defined by the claims, including all fair equivalents thereof.

What is claimed is:

1. A circuit for interconnecting a variable impedance fuel level sender of a fuel tank with a fuel gage of the type having nonlinear character, comprising:
   a source of input ignition voltage;
   a synchronizing circuit;
   a pulsed energy source controlled by said synchronizing circuit supplying a voltage level in proportion to said input ignition voltage and coupled to said sender for periodically energizing said sender;
   an impedance matching circuit having an impedance related to the impedance of said gage and coupled to said sender for sensing a condition indicative of the level of fuel in the fuel tank;
   a sample and hold circuit coupled to said impedance matching circuit and to said gage and controlled by said synchronizing circuit for sampling said condition sensed by said impedance matching circuit and supplying a signal for causing said gage to display the level of fuel in the fuel tank.

2. The circuit as in claim 1 wherein the synchronizing circuit is a microprocessor capable of sending a sequence of signals.

3. The circuit as in claim 1 wherein the sample and hold circuit is activated by said synchronizing circuit after said pulsed energy source has energized said sender.

4. The circuit as in claim 1 wherein the impedance matching circuit comprises a first and second resistor which are coupled to have a Thevenin impedance substantially equal to that of said gage.

5. The circuit as in claim 4 wherein said sender is connected in parallel with said first resistor and in series with said second resistor.

6. A fuel level gage sensor for preventing electrolysis of float resistive element comprising of:
   a switched power means capable of sending a sequence of at least three discrete signals;

a first power means producing a negative voltage, controlled in response to the first of said at least three discrete signals sent by the switched power means;

a second power means producing a positive voltage, controlled in response to the second of said at least three discrete signals sent by the switched power means;

a variable float device impedance level sender;

an impedance matching measurement means controlled in response to the third of said at least three discrete signals sent by the switched power means for receiving and measuring the impedance of the level sender and activated by the switched power means;

a sample and hold means for measuring the instantaneous signal from the impedance matching measurement means;

a voltage multiplier means for adjusting the signal from the sample and hold means;

and a current responsive gage means, connected to the voltage multiplier means.

7. The fuel level gage sensor as in claim 6 wherein the switched power means is comprised of:

a microprocessor capable of sending said sequence of at least three discrete signals;

a circuit means to sequentially activate said first power means, said second power means, and said resistance impedance matching means in response to said three discrete signals.

8. The fuel level gage sensor as in claim 6 wherein the variable float device is periodically energized by a discrete signal sent by the switched power means.

9. The fuel level gage sensor as in claim 6 wherein the variable float device is periodically energized at less than 50% duty cycles.

10. The fuel level gage sensor as in claim 6 wherein the resistance impedance matching means comprises:

a first resistor having first terminal connected to said switched power means controlling the flow of the second power source and having second terminal;

a second resistor having third and fourth terminals, said third terminal connected with the second terminal of said first resistor and said third terminal also connected to define a sampling point with the sample and hold means, and said fourth terminal connected to said switched power means controlling the flow of the first power source;

said level sender being coupled to said third and fourth terminals whereby the impedance of said level sender is measured;

said first and second resistors connected at second and third terminals to define a sampling point, said sampling point in turn connected to the fuel level sender gage and in parallel with the second resistor.

* * * * *